US008479006B2

(12) United States Patent
Sharif et al.

(10) Patent No.: US 8,479,006 B2
(45) Date of Patent: Jul. 2, 2013

(54) DIGITALLY SIGNING DOCUMENTS USING IDENTITY CONTEXT INFORMATION

(75) Inventors: Tariq Sharif, Issaquah, WA (US); Arun K. Nanda, Sammamish, WA (US); Craig H. Wittenberg, Mercer Island, WA (US); Lucas R. Melton, Redmond, WA (US); Richard Randall, Redmond, WA (US); Kim Cameron, Bellevue, WA (US); Hervey O. Wilson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 12/143,392

(22) Filed: Jun. 20, 2008

(65) Prior Publication Data

US 2009/0319795 A1    Dec. 24, 2009

(51) Int. Cl.
*H04L 9/32*    (2006.01)

(52) U.S. Cl.
USPC ............... 713/176; 726/9; 726/10; 726/20

(58) Field of Classification Search
USPC ............ 713/176, 150, 168, 170, 172; 705/65, 705/67; 726/5–7, 9
See application file for complete search history.

(56) References Cited

U.S. PATENT DOCUMENTS

| 6,515,988 | B1 | 2/2003 | Eldridge |
| 6,959,382 | B1 | 10/2005 | Kinnis et al. |
| 7,058,181 | B2 * | 6/2006 | Wright et al. ............... 380/270 |
| 7,069,443 | B2 * | 6/2006 | Berringer et al. ........... 713/180 |
| 7,178,030 | B2 | 2/2007 | Scheidt et al. |
| 7,237,114 | B1 | 6/2007 | Rosenberg |
| 7,769,690 | B2 * | 8/2010 | Dare et al. ................... 705/50 |
| 7,818,578 | B2 * | 10/2010 | Lewis et al. .................. 713/176 |
| 2005/0091495 | A1 | 4/2005 | Cameron et al. |
| 2005/0262353 | A1 | 11/2005 | Gentry et al. |
| 2006/0015933 | A1 | 1/2006 | Ballinger |
| 2006/0174334 | A1 | 8/2006 | Perlin |
| 2006/0288216 | A1 | 12/2006 | Buhler et al. |
| 2007/0118732 | A1 | 5/2007 | Whitmore |
| 2007/0204168 | A1 * | 8/2007 | Cameron et al. ............. 713/185 |
| 2007/0204325 | A1 | 8/2007 | Cameron et al. |
| 2007/0277040 | A1 * | 11/2007 | Scheidt et al. ............... 713/176 |
| 2008/0301769 | A1 * | 12/2008 | Parkinson ....................... 726/2 |
| 2009/0063854 | A1 * | 3/2009 | Parkinson .................... 713/158 |
| 2009/0300747 | A1 * | 12/2009 | Ahn ................................. 726/9 |

OTHER PUBLICATIONS

Microsoft Office Online, "Digitally sign an Office document", Based on information and belief available, at least as early as Apr. 17, 2008, copyright 2008, 4 pages.
E-Lock Technologies, "E-Lock ProSigner", Based on information and belief available, at least as early as Apr. 17, 2008, copyright 2007, 3 pages.
Avoco Secure, "Secure2sign for Microsoft Word Files", Based on information and belief available, at least as early as Apr. 17, 2008, 1 page.
ZDNET.CO.UK, "New identity management options for SMBs", Apr. 2007, 3 pages.

* cited by examiner

*Primary Examiner* — Linglan Edwards
(74) *Attorney, Agent, or Firm* — Workman Nydegger

(57) ABSTRACT

Creating a token for use by an entity when digitally signing documents. In a computing environment, a digital identity representation for an entity is accessed. The digital identity representation includes information identifying identity attributes about the entity and capabilities of an identity provider that provides tokens for use by the entity. Context information is accessed. The context information includes information about one or more of which, how or where the attributes for the entity identified in the digital identity representation will be used. A security token is created from the information in the digital identity representation and the context information. The security token makes assertions by the identity provider. The assertions are based on the information in the digital identity representation. The token further includes information related to at least a portion of the context information.

20 Claims, 4 Drawing Sheets

DIGITALLY SIGNING DOCUMENTS USING IDENTITY CONTEXT INFORMATION

BACKGROUND

Background and Relevant Art

Computers and computing systems have affected nearly every aspect of modern living. Computers are generally involved in work, recreation, healthcare, transportation, entertainment, household management, etc. In computer systems, there is often a need to send digital documents between computer systems.

Digital documents can be digitally signed. Digitally signing a document may involve including a security token with the document. Some security tokens generally include assertions by an identity provider about an entity. For example, a token may include assertions about attributes for an identity associated with an entity, where the assertions are made by a trusted identity provider entity. The assertions can be used to ensure that an entity is associated with a particular identity. For example, a token included with a document may include assertions that the subject of the token is a manager in an enterprise. The document including the token is then treated with a level of trust appropriate for entities who are managers in the enterprise.

Often, selecting which token to send is performed by the user who sends the document. Unsophisticated users, and in many cases sophisticated users, may have difficulty in selecting an appropriate token for inclusion with a document. In particular, a user entity may be associated with a number of different tokens, where each of the different tokens is intended for use in different contexts. For example, an entity may have a token associated with it where the token is related to the entity's role as a manager. The entity may have a different token associated with it, where the token is related to the entity's role as a company employee. The manager token may be appropriate for use in some contexts, while not appropriate in others, where only the employee token is appropriate. However, simply inspecting the tokens, without additional information, may not provide enough information to determine which token a user should select.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment. The method includes acts for creating a token for use by an entity when digitally signing documents. The method includes accessing a digital identity representation for an entity. The digital identity representation includes information identifying identity attributes about the entity and capabilities of an identity provider that provides tokens for use by the entity. The information identifying capabilities of the identity provider includes at least one of an indication of the identity of the identity provider or what assertions the identity provider can make. The method further includes accessing context information. The context information includes information about one or more of which, how or where the attributes for the entity identified in the digital identity representation will be used. The method further includes creating a security token from the information in the digital identity representation and the context information. The security token makes assertions by the identity provider. The assertions are based on the information in the digital identity representation. The token further includes information related to at least a portion of the context information.

Another embodiment includes another method that may be practiced in a computing environment. The method includes acts for facilitating selection of a token for use by an entity when digitally signing documents. The method includes accessing a collection of security tokens. Each security token makes assertions by an identity provider. The assertions are based on information in a digital identity representation. The digital identity representation includes information identifying identity attributes about an entity and capabilities of an identity provider that provides tokens for use by the entity. The information identifying capabilities of the identity provider includes at least one of an indication of the identity of the identity provider or what assertions the identity provider can make. The assertions are further based on information related to at least a portion of context information. The context information includes information about one or more of which, how or where the attributes for the entity identified in the digital identity representation will be used. The method further includes determining a context for a document that is to be signed using one of the security tokens in the collection of security tokens. The method further includes determining that the context matches context information in one or more security tokens in the collection of security tokens. Representations of the one or more security tokens are displayed to a user in a user interface that allows the user to select security tokens. Displaying includes displaying the representations of the one or more security tokens such that a user can readily determine that the security tokens include context information that matches the context.

Another embodiment includes a method that may be practiced in a computing environment. The method includes acts for evaluating document signatures and tokens used to sign the document. The method includes receiving a document signed by a token. The token includes context attributes. The context attributes include information related to at least a portion of context information. The context information includes information about one or more of which, how or where the attributes for the entity identified in the digital identity representation will be used. The token further includes identity attributes. The identity attributes include information in a digital identity representation. The digital identity representation includes information identifying identity attributes about an entity and capabilities of an identity provider that provides tokens for use by the entity. The information identifying capabilities of the identity provider includes at least one of an indication of the identity of the identity provider or what assertions the identity provider can make. The method also includes determining that the document is a validly signed document by determining that the context information in the token and the identity information in the token are pertinent to the use of the signature for signing the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments are directed to creating and/or using tokens which include, in addition to identity attributes, context information related to contexts where use of the tokens is appropriate. For example, a token may include assertions by an identity provider where the assertions include not only information related to identity of an entity, but also assertions by an identity provider related to one or more contexts where use of the token is appropriate.

Microsoft Corporation of Redmond, Wash., has propagated a system sometimes referred to as the Information Card Selector—Microsoft's instantiation being referred to as Windows CardSpace. In a Windows CardSpace system, an entity obtains one or more digital identity representations, sometimes referred to as information cards. When the entity attempts to access a resource or provide a document, a relying party may require a set of claims to be made about the entity to provide the resources or to trust the document. The entity may employ a digital identity representation (sometimes referred to as a "DIR") to initiate communication with an identity provider that can assert those claims. In some cases, the identity provider may be controlled by the entity and run on the entity's own machine. In others it may be controlled by a third party. The identity provider returns a security token that includes the required claims information.

Example embodiments disclosed herein may relate generally to identity systems including digital identity representations used in initiating communication for production of security tokens that can be exchanged between an entity, an identity provider, and a relying party to authenticate an identity and/or information related to the entity. In example embodiments herein, the entity may be a natural person or persons, a computer, a network, or any other entity. The relying party has goods, services, or other information that the entity desires to access and/or obtain, and/or receives documents or other information from the entity. In some example embodiments, the relying party can be any resource, privilege, or service that requires a security policy to enter, access, or use. For example, a relying party may comprise one or more of: computers, computer networks, data, databases, buildings, personnel, services, companies, organizations, physical locations, electronic devices, or any other type of resource.

Figure 1:
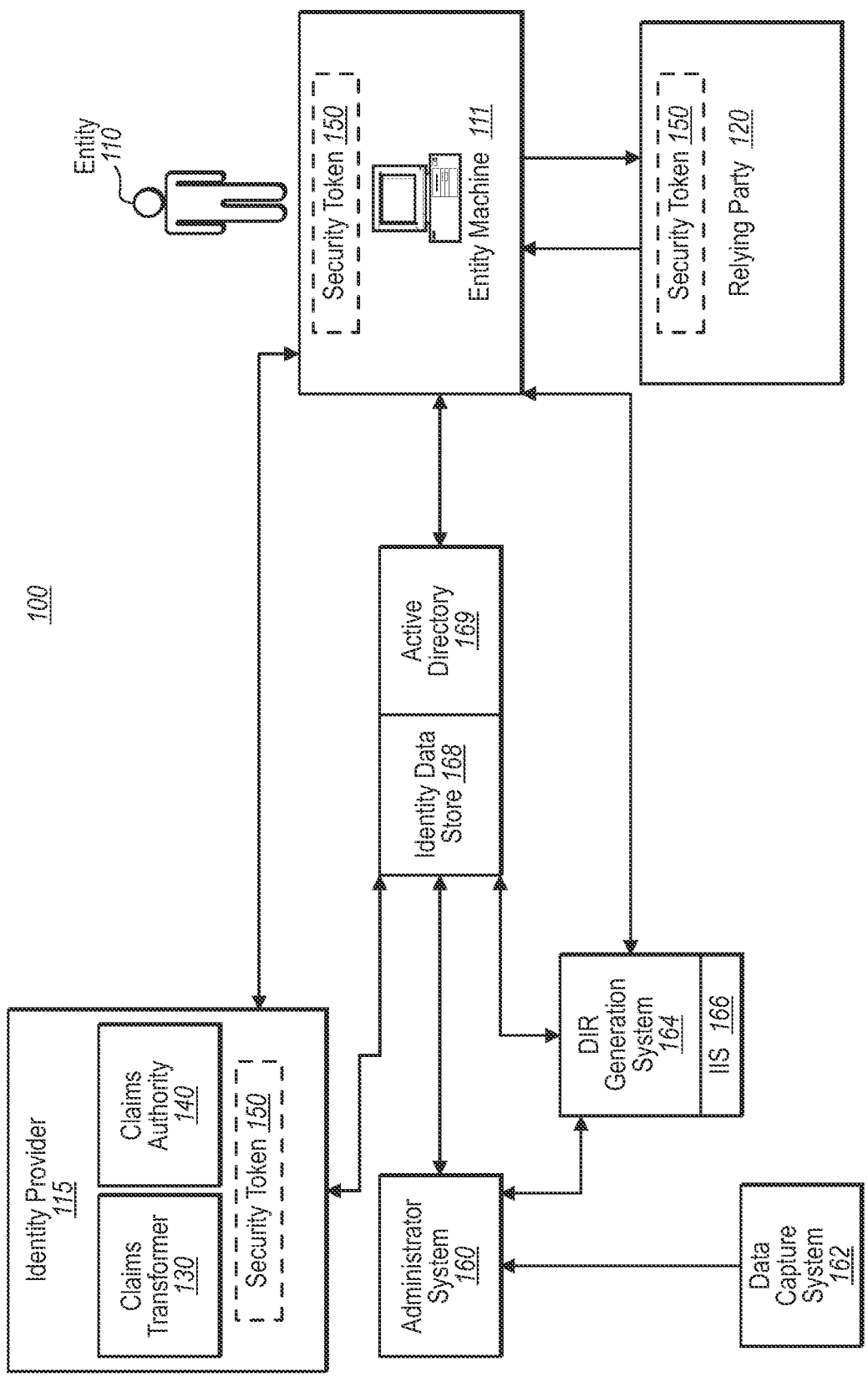
FIG. 1 illustrates a digital identity representation system configured to provide security tokens for entities.

Referring now to FIG. 1, an example digital identity representation system 100 is shown including an entity 110 and a relying party 120. Entity 110 is in possession or control over entity machine 111. Entity machine 111 includes a computer system at least temporarily controlled by the entity 110. Relying party 120 may also include a computer system. System 100 may also include an administrator system 160, a data capture system 162, a digital identity representation generation system 164, an identity data store 168, and an identity provider 115, each of which are discussed further below and may include, or be part of, a computer system.

Entity 110 and relying party 120 can communicate with each other over one or more networks, such as the Internet, or through telephonic or other forms of wired or wireless communication. In some embodiments, the entity 110 and relying party 120 may be associated with the same physical computer system, such that communication may take place over a computer bus or other internal computer communication means. In the example embodiments, entity 110 can request goods, services, information, privileges, or other access from relying party 120 or provide information to the relying party 120. Relying party 120 can require authentication of the identity, or information about, entity 110 before or in conjunction with providing the requested access to entity 110 or receiving information from the entity 110.

Also shown in FIG. 1 is an example identity provider 115. Identity provider 115 includes a computer system. In example embodiments, identity provider 115 includes a claims transformer 130 and a claims authority 140. The claims transformer 130 is sometimes referred to as a "security token service." In the example shown, identity provider 115 can provide one or more claims about entity 110. A claim is a statement or assertion made about the entity, possibly including attribute information about the entity such as, for example, name, address, social security number, age, credit history, transactional requirements, etc. As described further below, identity provider 115 can provide claims to entity 110 and/or relying party 120 in the form of a digitally signed security token. In example embodiments, identity provider 115 is in a trusted relationship with relying party 120, so that relying party 120 trusts the claims in the signed security token from identity provider 115.

Although claims transformer 130 and claims authority 140 of identity provider 115 are shown as separate entities in FIG. 1, in alternative embodiments claims transformer 130 and claims authority 140 can be the same entity or different entities. Identity provider 115 may take the form of a security token service in some example embodiments. Similarly, identity provider 115 and digital identity representation generation system 164 may be the same or different entities.

Computer systems described herein include, without limitation, a personal computer, server computer, hand-held or laptop device, microprocessor system, microprocessor-based system, programmable consumer electronics, network PCs, minicomputers, mainframe computer, smart card, telephone, mobile or cellular communication device, personal data assistant, distributed computing environment that includes any of the above systems or devices, and the like. Some computer systems described herein may comprise portable computing devices. Portable computing devices may include any computer system that is designed to be physically carried by a user. Each computer system may also include one or more peripherals, including without limitation: keyboard, mouse, a camera, a web camera, a video camera, a fingerprint scanner, an iris scanner, a display device such as a monitor, a microphone, or speakers.

Each computer system includes an operating system, such as (without limitation) the WINDOWS operating system from Microsoft Corporation, and one or more programs stored on the computer readable media. Each computer system may also include one or more input and output communications devices that allow the user to communicate with the computer system, as well as allow the computer system to communicate with other devices. Communications between the computer systems used by entity 110 (e.g., entity machine 111), relying party 120, digital identity representation generation system 164, administrator system 160, data capture system 162, and identity provider 115 can be implemented using any type of communications link, including, without limitation, the Internet, wide area networks, intranets, Ethernets, direct-wired paths, computer busses, satellites, infrared scans, cellular communications, or any other type of wired or wireless communications.

In some example embodiments disclosed herein, system 100 is implemented at least in part as an Information Card system provided in the .NET 3.0 framework developed by Microsoft Corporation of Redmond, Wash. The Information Card system allows entities to manage multiple digital identity representations from various identity providers.

The Information Card system utilizes a web services platform such as the Windows Communication Framework in the .NET 3.0 framework. In addition, the Information Card system is built using the Web Services Security Specifications propagated at least in part by Microsoft Corporation of Redmond, Wash. These specifications include a message security model WS-Security, an endpoint policy WS-SecurityPolicy, a metadata exchange protocol WS-MetadataExchange, and a trust model WS-Trust. Generally, the WS-Security model describes how to attach security tokens to messages. The WS-SecurityPolicy model describes end point policy requirements, such as required security tokens and supported encryption algorithms. Such policy requirements can be conveyed and negotiated using a metadata protocol defined by WS-MetadataExchange. The WS-Trust model describes a framework for trust models that enables different web services to interoperate. Some example embodiments described herein refer to the Web Services Security Specifications described above. In alternative embodiments, one or more other specifications can be used to facilitate communications between the various subsystems in system 100.

Referring again to FIG. 1, entity 110 can send a request via entity machine 111 to relying party 120 for access to goods, services, or other information, or can provide information in the form of documents to relying party 120. Notably, providing information in the form of documents, may in some embodiments, be part of the process of requesting access to goods, services and other information, and as such, should not be construed exclusive of such activities. For example, in one embodiment, entity machine 111 sends a request, where the request may be a document, to relying party 120 for access to information from relying party 120 that entity 110 desires. The request sent by entity machine 111 can include a request for the authentication requirements of relying party 120 using, for example, the mechanisms provided in WS-MetadataExchange.

In response to the request, relying party 120 may send entity machine 111 requirements for relying party 120 to authenticate entity's identity or other information about entity 110. The requirements of relying party 120 for authentication are referred to herein as a security policy. A security policy minimally defines the set of claims from a trusted identity provider 115 that the entity 110 must provide to relying party 120 for relying party 120 to authenticate entity 110. A security policy can include a requirement of proof regarding a personal characteristic (such as age), identity, financial status, etc. It can also include rules regarding the level of verification and authentication required to authenticate any offers of proof (e.g., digital signature from a particular identity provider).

In one example, relying party 120 specifies its security policy using WS-SecurityPolicy, including both the claim requirements and type of security token required by relying party 120. Examples of types of claims include, without limitation, the following: first name, last name, email address, street address, locality name or city, state or province, postal code, country, telephone number, social security number, date of birth, gender, personal identifier number, credit score, financial status, legal status, etc.

The security policy can also be used to specify the type of security token required by relying party 120, or a default type can be used as determined by the identity provider. In addition to specifying the required claims and token type, the security policy can specify a particular identity provider required by the relying party. Alternatively, the policy can omit this element, leaving the determination of the appropriate identity provider up to entity 110. Other elements can be specified in the security policy as well such as, for example, the freshness of the required security token.

In some embodiments, entity 110 can require that relying party 120 identify itself to entity machine 111 so that entity 110 can decide whether or not to satisfy the security policy of relying party 120, as described below. In one example, relying party 120 identifies itself using an X.509 certificate. In other embodiments, relying party 120 can identify itself using other mechanisms such as, for example, a Secure Sockets Layer ("SSL") server certificate.

Entity machine 111 may include one or more digital identity representations for entity 110. These digital identity representations (sometimes referred to as "Information Cards" in the Windows CardSpace system provided in the .NET 3.0 framework developed by Microsoft Corporation of Redmond, Wash.) are artifacts that represent the token issuance relationship between entity 110 and a particular identity provider, such as identity provider 115. Each digital identity representation may correspond to a particular identity provider, and entity 110 can have multiple digital identity representations from the same or different identity providers.

Digital identity representations can include, among other information, the identity provider's issuance policy for security tokens, including the type of tokens that can be issued, the claim types for which it has authority, and/or the credentials to use for authentication when requesting security tokens. Digital identity representations may be represented as XML documents that are issued by identity providers 115 or digital identity representation generation systems 164 and stored by entities 110 on a storage device such as entity machine 111.

Entity machine 111 may also include an identity selector. Generally, an identity selector is a computer program and user interface that permits entity 110 to select between one or more digital identity representations of entity 110 on entity machine 111 to request and obtain security tokens from one or more identity providers, such as identity provider 115. For example, when a security policy from relying party 120 is received by entity machine 111, the identity selector may be programmed to identify one or more digital identity representations that satisfy one or more of the claims required by the security policy using the information in digital identity representations. Once entity 110 receives the security policy from relying party 120, entity 110 can communicate with (using, for example, entity machine 111) one or more identity providers to gather the claims required by the policy.

In example embodiments, entity 110 requests one or more security tokens from identity provider 115 using the issuance mechanism described in WS-Trust. In example embodiments, entity 110 forwards the claim requirements in the policy of relying party 120 to identity provider 115. The identity of relying party 120 can, but need not, be specified in the request sent by entity 110 to identity provider 115. The request can include other requirements as well, such as a request for a display token.

Generally, claims authority 140 of identity provider 115 can provide one or more of the claims required by the security policy from relying party 120. Claims transformer 130 of identity provider 115 is programmed to transform the claims and to generate one or more signed security tokens 150 that include the claim(s) relating to entity 110.

As noted above, entity 110 can request a security token in a certain format in its request to identity provider 115, based on requirements from relying party 120. Claims transformer 130 can be programmed to generate security tokens in one of a plurality of formats including, without limitation, X.509, Kerberos, SAML (versions 1.0 and 2.0), Simple eXtensible Identity Protocol ("SXIP"), etc.

For example, in one embodiment, claims authority 140 is programmed to generate claims in a first format A, and the security policy of relying party 120 requires a security token in a second format B. Claims transformer 130 can transform the claims from claims authority 140 from format A into format B before sending a security token to entity 110. In addition, claims transformer 130 can be programmed to refine the semantics of a particular claim. In example embodiments, the semantics of a particular claim are transformed to minimize the amount of information provided in a particular claim and/or security token to reduce or minimize the amount of personal information that is conveyed by a given claim.

In example embodiments, claims transformer 130 forwards the security token 150 to entity 110 using the response mechanisms described in WS-Trust. In one embodiment, claims transformer 130 includes a security token service (sometimes referred to as an "STS"). In an example embodiment, entity 110 forwards security token 150 to relying party 120 by binding security token 150 to an to application message using the security binding mechanisms described in WS-Security. In some embodiments, the security token 150 may be used to sign a document (as will be illustrated in more detail in FIG. 2). The document can be used to provide information or to request goods, services, or other information. In other embodiments, security token 150 may be sent directly from the identity provider 115 to relying party 120.

Once relying party 120 receives security token 150, relying party 120 can verify (e.g., by decoding or decrypting the security token 150) the origin of signed security token 150. Relying party 120 can also utilize the claim(s) in security token 150 to satisfy the security policy of relying party 120 to authenticate entity 110.

Figure 2:
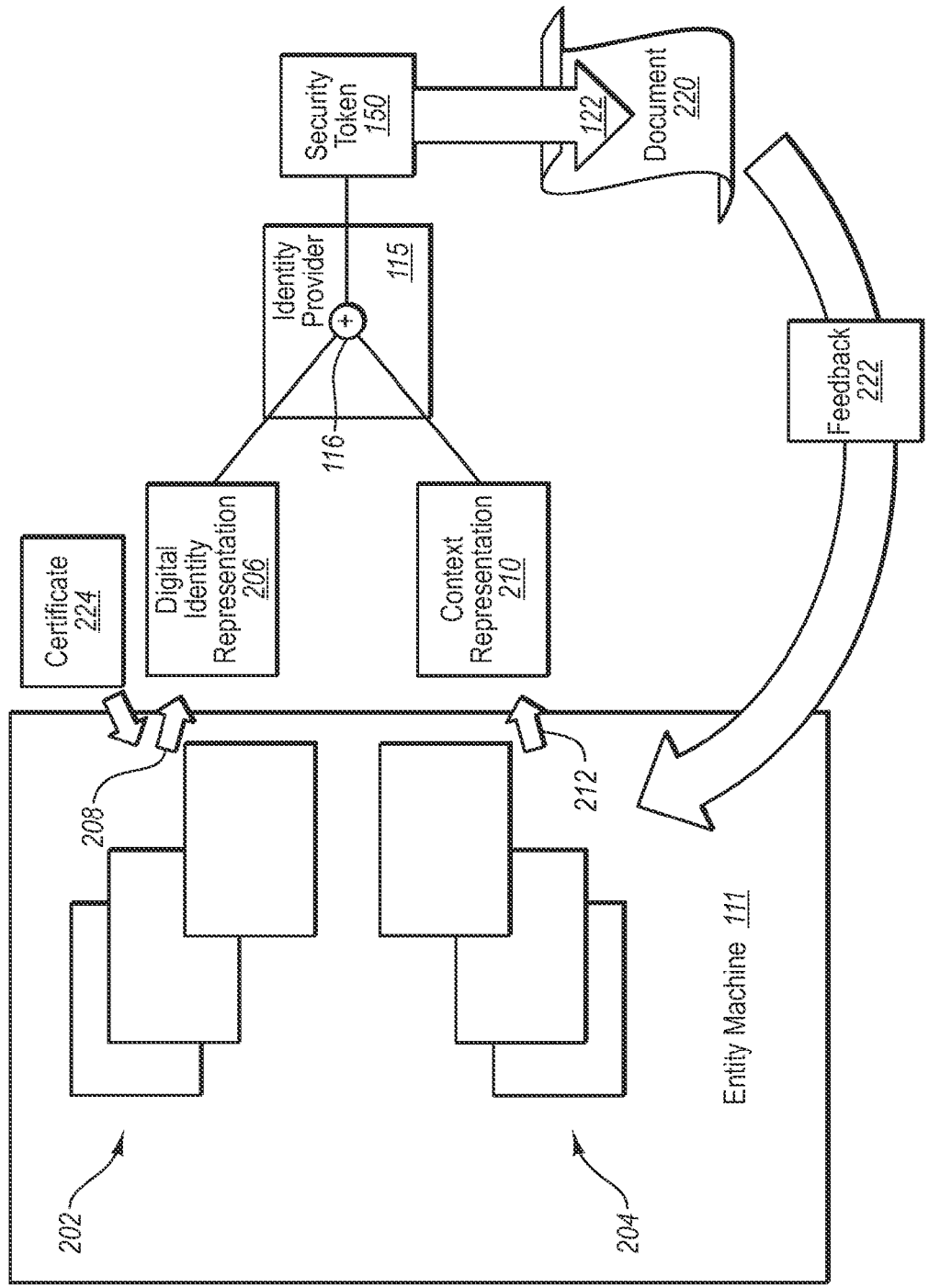
FIG. 2 illustrates a security token creation process including creating security tokens with context information in the security token.
Figure 3:
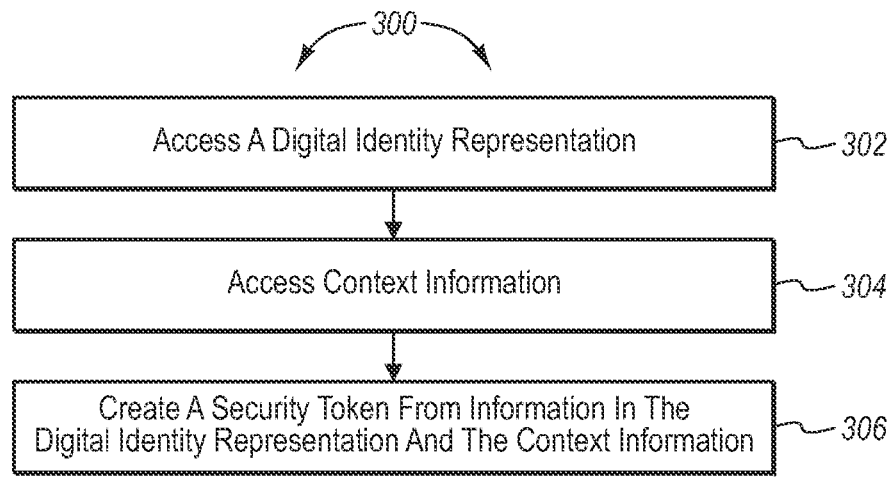
FIG. 3 illustrates a method of creating a security token.

Various examples of document signing will now be illustrated with reference to FIG. 2. FIG. 2 illustrates schematically a token creation process. In particular, FIG. 2 illustrates a plurality 202 of digital identity representations. Each of the digital identity representations in the plurality 202 of digital identity representations includes attributes of an identity associated with an entity. Examples of attributes include, but are not limited to, names, usernames, identification numbers (such as government issued, enterprise issued, educational institution issued, etc. identification numbers), account numbers (such as bank account numbers, credit card numbers, business credit account numbers, etc.), role information (such as manager, employee, network administrator, mayor, citizen, etc.) or other information. Virtually any kind of information that can be associated with an identity could be included as an attribute in a digital identity representation. Some embodiments may limit the information that can be included as attributes. For example, some embodiments may limit the information that can be included as attributes to one or more of the attributes enumerated above.

FIG. 2 further illustrates a plurality 204 of context representations. Each context representation includes information about a context. In particular a context representation may include context information about a document signing event. Such context information may be related to circumstances surrounding the signing of a document, such as the type of document to be signed, what type of authority is needed to sign the document, the purpose of the document, what the document will be used for, etc. In summary, any information such as information concerning which digital identity representations should be used, how the digital identity representations will be used, or where the identity representations will be used in conjunction with a signing event or ceremony may be construed as context information. Some embodiments may limit the information that can be included as context information. For example, some embodiments may limit the information that can be included as context information to one or more of the information enumerated above.

While in this example, a plurality 202 of digital identity representations and a plurality 204 of context representation are shown, some embodiments allow for a digital identity representations and context representation to be constructed dynamically without necessarily requiring them to be selected from their respective plurality 202 or 204.

In the example illustrated in FIG. 2 a digital identity representation 206 is selected as illustrated by the arrow 208 from the plurality 202 of digital identity representations. Additionally a context representation 210 including context information is selected as illustrated by the arrow 212 from the plurality 204 of context representations. The digital identity representation 206 and the context representation may be selected in a number of different ways. For example, FIG. 2 illustrates that the selection of the digital identity representation 206 may be facilitated by the receipt of a particular certificate 224. In particular, if the entity machine receives a certificate 224, the receipt may initiate selection of the digital identity representation 206 from the plurality 202 of digital identity representations.

In some embodiments, as will be explained in more detail below, selection of a digital identity representation 206 and/or a context representation 210 may be facilitated by the use of feedback 222 as is illustrated in FIG. 2. For example, in one embodiment, a document may include metadata specifying appropriate characteristics of a token to be used when signing the document.

The digital identity representation 206 and the context representation 210 are provided to an identity provider 115. As described previously, an identity provider 115 is a trusted entity capable of making assertions in security tokens. In the example illustrated in FIG. 2, the identity provider 115 combines information from the digital identity representation 206 and information from the context representation 210 as illustrated by the sum operation 116. The combined information from the digital identity representation 206 and the context representation 210 are included in a security token 150.

The security token 150 includes assertions made by the identity provider 115 including assertions which include attributes for an identity for an entity associated with the digital identity representation 206 and context information from the context representation 210. The security token 150, in some embodiments, may further include a public key which can be used to sign and/or encrypt digital information. For example, FIG. 2 illustrates that the security token 150 is included (as illustrated by the arrow 122) in the document 220 in a signing ceremony for the document 220. The security token 150 may include a public key that is used to sign all or portions of the document 220.

The security token 150, as noted previously herein, includes context information from the context representation 210 where the context information pertains to the document 220 in particular. For example, the context information included in the security token 150 may pertain to the type of the document 220. Alternatively or additionally, the context information included in the security token 150 may pertain to context circumstances associated with the signing ceremony in which the document 220 is signed with the security token 150.

As noted previously, a context representation 110 may be selected for inclusion in a security token 150 based on feedback 222. As illustrated in FIG. 2 by the arrow 224, the feedback 222 may be provided based on context related to signing circumstances of a document 220. For example, in one embodiment, the document 220 may include metadata indicating a context in which the document 220 will be signed. The metadata included in the document 220 can be sent as feedback 222 to a context representation selection process embodied as a computer executable process on a computer system such that the feedback 222 facilitates the selection of the context representation 210 with context information that will be included in the security token 150 used to sign the document 220. Additionally, the feedback 222 may be used in selecting an appropriate digital identity representation 206 for inclusion in the security token 150. In particular, assigning context of the document 220 likely requires a particular digital identity representation 206 to be included in the security token 150 used to sign the document 220. Thus the document itself may include information that can be used in identifying the digital identity representation 206. For example, the document 220 may include metadata which indicates that the document 220 should be signed with a security token 150 appropriate for a manager or other role. This metadata can be sent as feedback 222 which can be used to select a digital identity representation 206 which is appropriate for a manager. Additionally a context representation 210 indicating context related to manager identities may be created or selected such that the security token 150 can include context information identifying a security token 150 as a token appropriate for use by a manager when signing documents such as the document 220.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

One embodiment includes a method 300 that may be practiced in a computing environment. The method 300 includes acts for creating a token for use by an entity when digitally signing documents. The method includes accessing a digital identity representation for an entity (act 302). The digital identity representation includes information identifying identity attributes about the entity. For example, the digital identity representation 206 (see FIG. 2) may include attributes of entity 110 (see FIG. 1), such as name, username, identifier number, account number, role, etc. The digital identity representation further includes capabilities of an identity provider that provides tokens for use by the entity. For example, the digital identity representation 206 (FIG. 2) may include information identifying the capabilities of the identity provider 115. The information identifying capabilities of the identity provider may include at least one of an indication of the identity of the identity provider or what assertions the identity provider can make;

The method of 300 further includes accessing context information (act 304). The context information includes information about one or more of which, how or where the attributes for the entity identified in the digital identity representation will be used. For example, and is illustrated in FIG. 2, the context representation 210 may include information about how or where information in the digital identity representation 206 will be used. In particular, the context representation 210 may include information about how the attributes in the digital identity representation 206 will be used when the security token 150 containing those attributes is used.

The method 300 further includes creating a security token from the information in the digital identity representation and the context information (act 306). The security token includes assertions made by the identity provider where the assertions are based on the information in the digital identity representation. The token further includes information related to at least a portion of the context information. In particular, as illustrated in FIG. 2, the security token 150 makes assertions where those assertions include information from the digital identity representation 206 and information from the context representation 210.

The method 300 may be performed where creating a security token (act 306) is performed in response to determining that a token is needed for signing a particular document. In addition, at least one of conditions related to signing the particular document, or attributes of the particular document are related to at least a portion of the context information. For example, this may be accomplished by receiving feedback, such as feedback 222 illustrated in FIG. 2. It should be noted that not only can information related to a specific document or related to a specific document signing ceremony be used to facilitate selecting a digital identity representation and/or a context representation, but can also be used to trigger the creation of the security token in the first instance.

The method 300 may further include evaluating as inputs at least one of at least a portion of the context information or at least a portion of the information in the digital identity representation and determining from the at least one of at least a portion of the context information or at least a portion of the information in the digital identity representation that a security token should be created. Creating a security token (act 306) is performed in response thereto.

This embodiment of the method 300 may be practiced where determining from the at least one of at least a portion of the context information or at least a portion of the information in the digital identity representation that a security token should be created includes executing a workflow.

The method 300 may further include receiving additional input separate from the context information and the information in the digital identity representation. In one example of this embodiment, that act of determining the at least one of at least a portion of the context information or at least a portion of the information in the digital identity representation that a security token should be created takes into account the additional input. In one example of this embodiment, the method 300 may include prompting for user interaction for a user to provide user input as the additional input. Thus, receiving additional input separate from the context information and the information in the digital identity representation is performed in response thereto. Such input may include information about the entity 110, other entities, administrators, thresholds, exceptional approvals, substitute approvals, etc.

The method 300 may further include caching the created security token in a collection of security tokens. In this embodiment, the method 300 may further includes acts allowing a user to select a token for use in a document signing ceremony. For example the method 300 may further include determining a context for a document that is to be signed using one of the security tokens in the collection of security tokens, determining that the context matches context information in one or more security tokens in the collection of security tokens, and displaying representations of the one or more security tokens to a user in a user interface that allows the user to select displayed security tokens. This may include displaying representations of the one or more security tokens such that a user can readily determine that the security tokens include context information that matches the context. For example representations of the security tokens may be highlighted. In an alternative embodiment, displaying may include displaying only representations of tokens that include the context information that matches the context while not displaying representations of tokens that do not include the context information that matches the context. Displaying representations of security tokens may include any one of a number of different acts. For example, an assigned name of a security token may be displayed. A graphical representation such as an icon may be displayed. Information in the security token itself, such as identity attributes and/or context attributes may be displayed. Other suitable representations may additionally or alternatively be used within the scope of embodiments described herein, even though not enumerated here.

Figure 4:
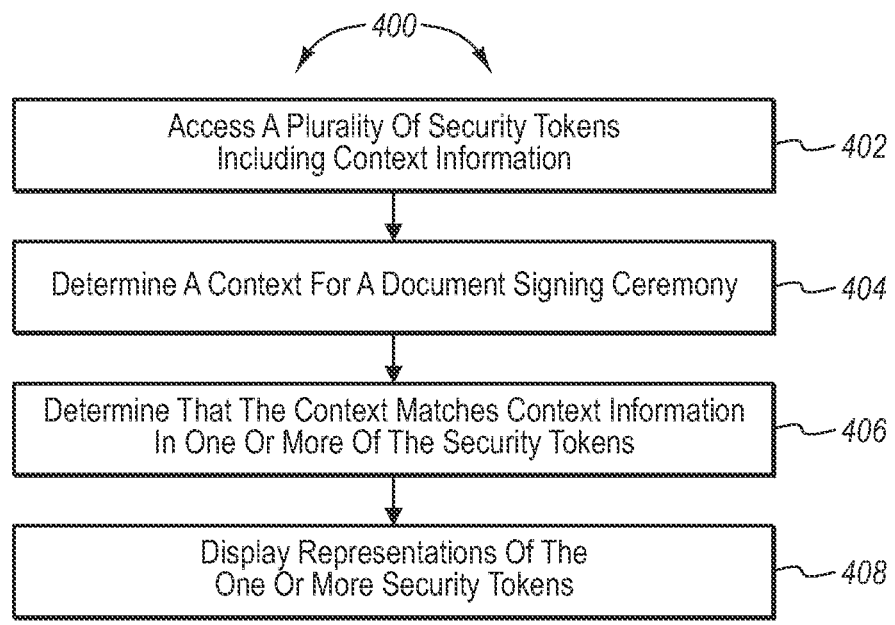
FIG. 4 illustrates a method of displaying security tokens for facilitating selection of an appropriate security token.

Referring now to FIG. 4, a method 400 is illustrated. The method 400 may be practiced in a computing environment. The method includes acts for facilitating selection of a token for use by an entity when digitally signing documents. The method includes accessing a collection of security tokens (act 402). Each security token makes assertions by an identity provider. The assertions are based on information in a digital identity representation. The digital identity representation comprises information identifying identity attributes about an entity and capabilities of an identity provider that provides tokens for use by the entity. The information identifying capabilities of the identity provider includes at least one of an indication of the identity of the identity provider or what assertions the identity provider can make. The assertions are further based on information related to at least a portion of context information. The context information includes information about one or more of which, how or where the attributes for the entity identified in the digital identity representation will be used.

The method 400 further includes determining a context for a document signing ceremony (act 404) that is to be signed using one of the security tokens in the collection of security tokens. For example, the context may be related to a role or identity associated with a token required to sign the document, how the document should be signed, what kind of information should be included in a token used to sign the document, etc.

The method 400 further includes determining that the context matches context information in one or more security tokens in the collection of security tokens (act 406). For example context information in a security token may match a context for a signing ceremony. The context for the signing ceremony may be determined, in one example, based on information stored in a document to be signed where the information is returned to, or accessed by a computing system which executes programmatic instructions which cause one or more computer processors to perform the act of determining that the context matches context information in one or more security tokens.

The method 400 further includes displaying representations of the one or more security tokens to a user (act 408). The representations of the one or more security tokens may be displayed to a user in a user interface, such as a graphical user interface, that allows the user to select security tokens. Displaying representations of the one more security tokens includes displaying the representations of the one or more security tokens such that a user can readily determine that the security tokens include context information that matches the context. In some embodiments, this may include displaying the one or more security tokens in a graphical user interface with the graphical user interface elements highlighting the tokens. Alternatively or additionally, displaying representations of the one or more security tokens such that a user can readily determine that the security tokens include context information that matches the context and may include displaying, only tokens that include the context information.

The method 400 may further include receiving user input selecting one of the tokens and as a result signing the document with the selected token. For example, a user may select a token by interacting with user interface elements allowing selection of one of the displayed representations. User selection of a token results in the token being used by a computing system to sign a document for which the token was selected.

In another embodiment of the method 400, the method 400 may include receiving user input and as a result and based on the user input displaying fewer of the one or more security tokens in a manner such that a user can readily determine that the security tokens include context information that matches the context. For example, context may be supplied by a user interacting with an appropriate computer implemented user interface, such as a computer displayed graphical user interface. The context supplied by the user may be matched to context information in a token, and tokens with context information matching the user supplied context may be displayed in a manner such that the user can readily determine that the token includes context information that matches the context.

Figure 5:
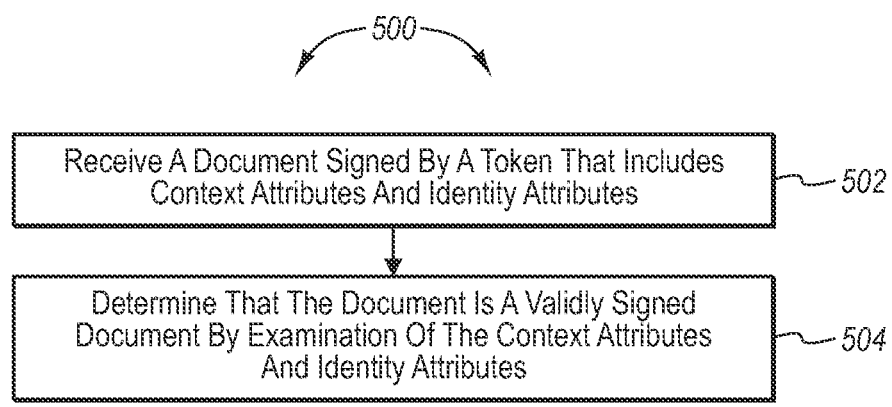
FIG. 5 illustrates a method of validating the use of a security token.

Referring now to FIG. 5, a method 500 is illustrated. The method 500 may be practiced in a computing environment. The method 500 includes acts for evaluating document signatures and tokens used to sign the document. The method 500 includes receiving a document signed by a token (act 502). The token includes context attributes. The context attributes include information related to at least a portion of context information. The context information includes information about one or more of which, how or where the attributes for the entity identified in the digital identity representation will be used. The token also includes identity attributes. The identity attributes include information in a digital identity representation. The digital identity representation information identifying identity attributes about an entity and capabilities of an identity provider that provides tokens for use by the entity. The information identifying capabilities of the identity provider includes at least one of an indication of the identity of the identity provider or what assertions the identity provider can make.

The method 500 further includes determining that the document is a validly signed document by examination of the context attributes and identity attributes (act 504). This may be performed, in one embodiment, by determining that the context information in the token and the identity information in the token are pertinent to the use of the signature for signing the document.

Embodiments of the method 500 may be performed where determining that the document is a validly signed document comprises executing a computer implemented workflow.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment a method of creating a token for use by an entity when digitally signing documents, the method comprising:
accessing a digital identity representation for an entity, wherein the digital identity representation comprises information identifying identity attributes about the entity and capabilities of an identity provider that provides tokens for use by the entity, wherein the information identifying capabilities of the identity provider includes at least one of an indication of the identity of the identity provider and what assertions the identity provider can make;
accessing context information, the context information including information about which, how and where the attributes for the entity identified in the digital identity representation will be used, wherein the attributes are contained within the accessed digital identity representation, and the context information including information about a document signing event which is associated with circumstances surrounding the signing of the document, comprising, a type of document to be signed, and a type of authority needed to sign the document; and
creating a security token using both the information in the digital identity representation and the context information, the security token including assertions by the identity provider based on the information in the digital identity representation, and the token further comprising information related to at least a portion of the context information.

2. The method of claim 1, wherein creating a security token is performed in response to determining that a token is needed for signing a particular document, where at least one of conditions related to signing the particular document, or attributes of the particular document are related to at least a portion of the context information.

3. The method of claim 1, further comprising:
evaluating as inputs at least one of at least a portion of the context information or at least a portion of the information in the digital identity representation; and
determining from the at least one of at least a portion of the context information or at least a portion of the information in the digital identity representation that a security token should be created and wherein creating a security token is performed in response thereto.

4. The method of claim 3 wherein determining from the at least one of at least a portion of the context information or at least a portion of the information in the digital identity representation that a security token should be created comprises executing a workflow.

5. The method of claim 3 further comprising receiving additional input separate from the context information and the information in the digital identity representation and wherein determining from the at least one of at least a portion of the context information or at least a portion of the information in the digital identity representation that a security token should be created takes into account the additional input.

6. The method of claim 5, further comprising prompting for user interaction for a user to provide user input, and wherein receiving additional input separate from the context information and the information in the digital identity representation is performed in response thereto.

7. The method of claim 1, further comprising caching the created security token in a collection of security tokens.

8. The method of claim 7, further comprising:
determining a context for a document that is to be signed using one of the security tokens in the collection of security tokens;
determining that the context matches context information in one or more security tokens in the collection of security tokens;
displaying representations of the one or more security tokens to a user in a user interface that allows the user to select security tokens for which a representation is displayed, including displaying representations of the one or more security tokens such that a user can readily determine that the security tokens include context information that matches the context.

9. The method of claim 1, wherein at least one of accessing a digital identity representation or accessing context information comprises selecting a digital identity representation from a plurality of digital identity representations or selecting a context representation from a plurality of context representations.

10. The method of claim 9, wherein at least one of selecting a digital identity representation from a plurality of digital identity representations or selecting a context representation from a plurality of context representations is performed in response to receiving feedback, the feedback including information related to a document signing ceremony intended to use the security token.

11. The method of claim 9, wherein selecting a digital identity representation from a plurality of digital identity representations is performed in response to receiving a certificate.

12. In a computing environment a method of facilitating selection of a token for use by an entity when digitally signing documents, the method comprising:
    accessing a collection of security tokens, wherein each security token makes assertions by an identity provider where the assertions are based on:
        information in a digital identity representation, wherein the digital identity representation comprises information identifying identity attributes about an entity and capabilities of an identity provider that provides tokens for use by the entity, wherein the information identifying capabilities of the identity provider includes at least one of an indication of the identity of the identity provider and what assertions the identity provider can make, and
        information related to at least a portion of context information, wherein the context information includes information about which, how and where the attributes for the entity identified in the digital identity representation will be used, wherein the attributes are contained within the digital identity representation, and the context information including information about a document signing event which is associated with circumstances surrounding the signing of the document, comprising, a type of document to be signed, and a type of authority needed to sign the document;
    determining a context for a document that is to be signed using one of the security tokens in the collection of security tokens;
    determining that the context matches the context information in one or more security tokens in the collection of security tokens; and
    displaying representations of the one or more security tokens to a user in a user interface that allows the user to select security tokens, including displaying the representations of the one or more security tokens such that a user can readily determine that the security tokens include context information that matches the context.

13. The method of claim 12, wherein displaying representations of the one or more security tokens to a user in a user interface comprises displaying in a graphical user interface.

14. The method of claim 13, wherein displaying representations of the one or more security tokens to a user in a user interface comprises one or more of highlighting representations of tokens, displaying only tokens that include the context information; or displaying representations of tokens that include context information that matches the context in a non-grayed out format while displaying representations of tokens that do not include context information that matches the context in a grayed out format.

15. The method of claim 12, further comprising receiving user input selecting one of the tokens and as a result signing the document with the selected token.

16. The method of claim 12, further comprising receiving user input and as a result and based on the user input displaying fewer of the one or more security tokens in a manner such that a user can readily determine that the security tokens include context information that matches the context.

17. In a computing environment, a method of evaluating document signatures and tokens used to sign the document, the method comprising:
    receiving a document signed by a token, the token comprising:
        identity attributes, wherein the identity attributes comprise information in a digital identity representation, wherein the digital identity representation comprises information identifying identity attributes about an entity and capabilities of an identity provider that provides tokens for use by the entity, wherein the information identifying capabilities of the identity provider includes at least one of an indication of the identity of the identity provider and what assertions the identity provider can make;
        context attributes, wherein the context attributes comprise information related to at least a portion of context information, wherein the context information includes information about which, how and where the attributes for the entity identified in the digital identity representation will be used, and the context information including information about a document signing event which is associated with circumstances surrounding the signing of the document, comprising, a type of document to be signed, and a type of authority needed to sign the document; and
    determining that the document is a validly signed document by determining that the context information in the token and the identity information in the token are pertinent to the use of the signature for signing the document.

18. The method of claim 17, wherein determining that the document is a validly signed document by determining that the context information in the token and the identity information in the token are pertinent to the use of the signature for signing the document comprises executing a workflow.

19. The method of claim 17 further comprising, providing feedback prior to receiving the document signed by the token, wherein the feedback is used to select at least a portion of the context attributes or the identity attributes included in the token.

20. The method of claim 17 further comprising, providing context about the document prior to receiving the document signed by the token, wherein the context is used to select the context attributes included in the token.

* * * * *